July 17, 1934.  S. GEORGE  1,966,794
HYDRAULIC VALVE TAPPET ASSEMBLY
Filed Oct. 24, 1932
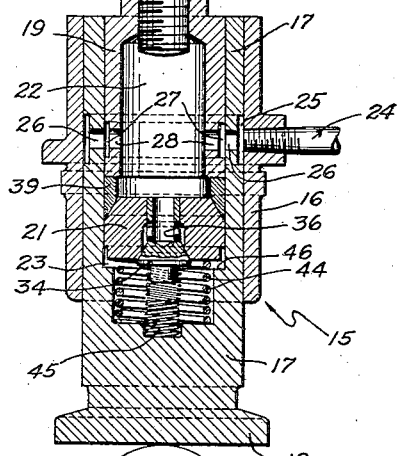
Fig. 1
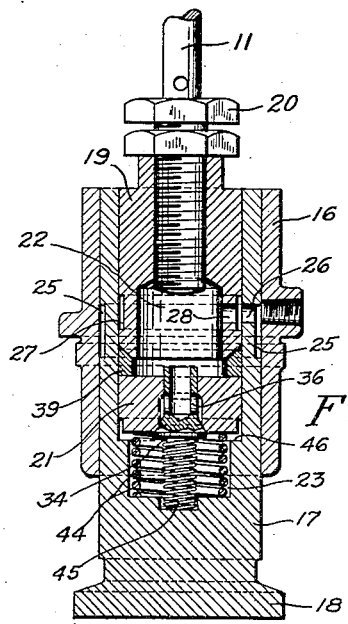
Fig. 8
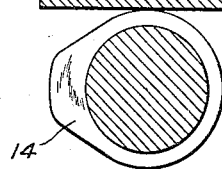
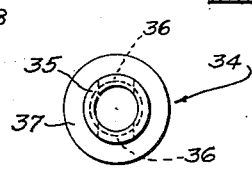
Fig. 4
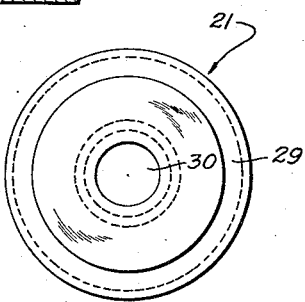
Fig. 2
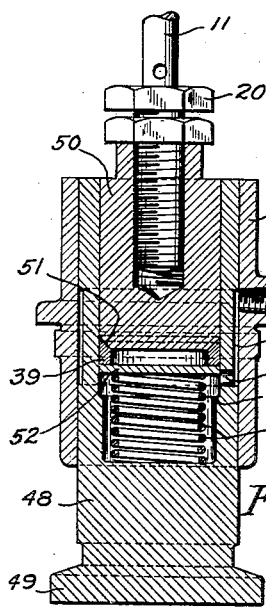
Fig. 9
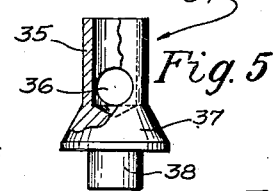
Fig. 5
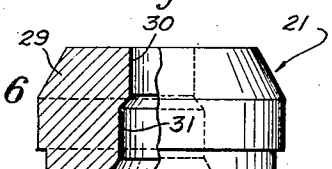
Fig. 6
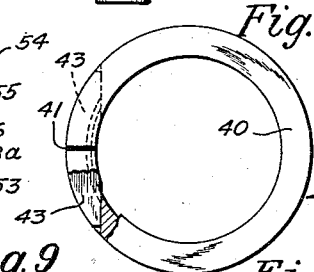
Fig. 7
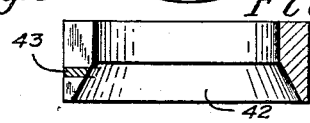
INVENTOR
Stephen George
BY
Wooster & Davis
ATTORNEYS Patented July 17, 1934

1,966,794

UNITED STATES PATENT OFFICE 1,966,794

HYDRAULIC VALVE TAPPET ASSEMBLY

Stephen George, Shelton, Conn.

Application October 24, 1932, Serial No. 639,236

9 Claims. (Cl. 123—90)

This invention relates to new and useful improvements in valve operating mechanism and has particular relation to hydraulic valve tappet assemblies.

An object of the invention is to provide a valve tappet arrangement of such construction that a quiet tappet is obtained.

A more specific object is to provide a tappet construction including means whereby the tappet is constantly held in engagement with the usual operating cam and the stem of the poppet valve by a fluid under pressure and through which fluid motion from the operating cam is transmitted to the valve, the said fluid forming a cushioning medium to compensate for expansion of the parts due to heating.

Another object is to provide a means as stated and which is of simple construction and wherein the necessary fluid under pressure may be supplied by the usual oil pump of an automobile engine.

Another object is to provide an improved packing ring or member which may be used in a hydraulic valve tappet assembly to prevent the leakage of oil or other fluid utilized.

Other objects and advantages will become apparent from a consideration of the following detailed description taken in connection with the accompanying drawing wherein satisfactory embodiments of the invention are shown. However, it will be understood that the invention is not limited to the details disclosed but includes all such variations and modifications as fall within the spirit of the invention and the scope of the appended claims.

In the drawing:

Fig. 1 is a vertical central sectional view through a valve tappet assembly constructed according to the present invention;

Fig. 2 is a top plan view of a piston employed;

Fig. 3 is a view partly in side elevation and partly in section showing said piston;

Fig. 4 is a top plan view of a valve employed in the piston;

Fig. 5 is a side elevational view of said valve, a part being broken away;

Fig. 6 is a plan view of an improved packing ring employed, a part being broken away;

Fig. 7 is a sectional view of said packing ring;

Fig. 8 is a view similar to Fig. 1 but showing a slightly modified construction; and Fig. 9 is a similar view showing a further modification.

As is well known, the valves of a large proportion of internal combustion engines are raised off their seats by tappets operated by cams. To insure seating of the valves and to provide for expansion of the parts as the engine heats up during operation, the usual arrangement is to have the tappet normally occupy a position spaced slightly from the outer end of the valve stem. With this arrangement manner-like blows take place as the tappet engages the valve stem and additional noise is created by the tappet jumping on the operating cam.

According to the present invention, the tappet is always in engagement with its operating cam and with the end of the stem of the valve which it operates. This eliminates the usual noisy action mentioned and also reduces wear between the parts. Further, the tappet of the present invention is self-adjusting for wear and is positive in its operation.

Tappets have been constructed in which a plunger or cushion of oil was used for transmitting motion from the cam to the valve, but a great deal of difficulty has been encountered in leakage of this oil during operation as only a slight leakage is required to cause delayed opening of the valve, and this is particularly objectionable while the engine is operating at the lower speeds as due to the lower speed the oil had a greater chance to escape. Naturally this difficulty increased with wear of the parts in operation. I have overcome these difficulties in my improved construction.

Referring in detail to the drawing, and at first particularly to Figs. 1 through 7, at 10 is shown a poppet valve including a stem 11 and arranged to seat in a member 12 which may be a portion of the block of an internal combustion engine. A coil spring 13 serves to return said valve to its seat when it has been moved therefrom by the cam 14 acting through the tappet assembly generally designated 15.

The tappet assembly 15 includes a stationary guide or housing 16 open at its upper and lower ends and formed as part of the engine block or otherwise as desired. Within the guide 16 is arranged a cylinder 17 open at its upper end and closed at its lower end at which it includes a head 18 riding on the cam 14. Arranged within the open end of the cylinder and slidable therein is a hollow plunger 19 open at its inner end and at its outer or upper end it may carry an adjusting bolt or screw 20 engaging the lower or free end of the stem 11 of valve 10. Although I have shown this adjusting screw or bolt in the drawing for the purpose of adjustment, if desired, it is really not necessary as my improved tappet construction is self-adjusting and this adjusting screw can therefore ordinarily be omitted.

Cylinder 17 and plunger 19 co-operate to provide a chamber within which is arranged a piston 21 dividing the chamber into an upper compartment 22 and a lower compartment 23. Guide 16 is provided with a tapped opening receiving an end of a pipe or tube 24 connected with the usual oil pump of an automobile or with other means for supplying it with oil or other fluid under pressure. In line with the inner or discharge end of pipe 24 the cylinder 17 is provided with a circumferentially extending groove 25 from which ports 26 lead to the interior of the cylinder.

In its outer surface the plunger 19 is provided with a circumferentially extending groove 27 arranged in alignment with the ports 26 and itself communicating with the interior of the plunger through ports 28. It will, of course, be understood that cylinder 17 is slidable in the guide or housing 16 and is also turnable therein and that the plunger is capable of the same movements in the cylinder. Owing to the fact that the parts are relatively turnable, the grooves 25 and 27 are employed since by this means the ports are constantly supplied with oil under pressure no matter what the relative angular positions of the parts are since the grooves will be kept filled with oil or other fluid under pressure.

The piston 21 is on its outer surface adjacent one of its ends tapered as at 29 (see Fig. 3) for a purpose later to be described. A port or opening 30 is provided centrally through the piston and is somewhat enlarged inwardly of the upper surface of the piston as at 31, and at the inner end or side of the piston is flared to provide a valve seat 32. A valve 34 (see Figs. 4 and 5) is in the assembled device arranged in the port or opening 30 through the piston and this valve includes a hollow guide portion or stem 35 open at its upper end and inwardly of said end provided with lateral openings or passages 36 where by fluid entering the stem at its upper end may escape through said passages. This stem guides the valve in the opening 30 and properly centers it. Inwardly of the passages or ports 36 the valve includes an inclined or cone-like portion 37 adapted to engage the seat 36 on the piston and inwardly of said portion 37 the valve includes a stem 38.

A packing ring member 39 is arranged in the compartment 22 between the inner end of the plunger 19 and the piston 21 and in engagement with the inner surface of the cylinder member 17. This packing (see Figs. 6 and 7) includes a ring-like body member 40, preferably of metal, split as at 41 and having a portion tapered on its inner surface as at 42. A shim 43 spans the split 41 and is arranged in the lower or tapered portion of the ring and extends from the outer to the inner periphery thereof. This shim forms a seal across the split 41 of the ring as will later more fully appear.

In the assembly the tapered surface 42 of the packing ring engages the tapered surface 29 of the piston 21 and a coil spring 44 in the compartment 23 constantly urges the piston upwardly pressing the tapered surface 29 thereof against the inner tapered surface 42 of the packing ring in a manner to cause spreading of said ring so as to force the ring against the inner surface of cylinder 17. Also, the action of the spring is such as to hold the piston in substantially the position in which it is shown in Fig. 1 and to cause the piston to force or push the packing ring against the inner end of the plunger 19.

With this arrangement it will be noted that the ring forms a very effective seal to prevent leakage of fluid in either direction between the piston and the inner wall of the cylinder and between the plunger and the inner wall of the cylinder. Since the shim 43 is in the tapered portion of the ring and extends from the inner to the outer periphery thereof, movement of the piston into the ring and spreading of the ring will result in the shim being pressed between the surfaces which are to be sealed whereby leakage through the split in the ring is prevented. Obviously, the split may be at an angle rather than straight across the ring as shown in Fig. 6.

The valve 34 is normally maintained seated as by a light coil spring 45 arranged in the compartment 23 and at its upper end receiving the lower portion or stem 38 of the valve. When this valve is seated or closed it is apparent that fluid may not pass from the compartment 22 to the compartment 23 or vice versa. However, when the pressure of fluid in the compartment 22 is greater than that of the fluid in the compartment 23 the valve 34 will be unseated against the action of spring 45 and fluid will enter the compartment 23 whereby to equalize the pressure in the two compartments. When the pressure in compartment 23 is built up the pressure of the fluid will assist the spring 45 in reseating the valve 34.

In operation when the pressure in the pipe line and in the chamber 22 is greater than the pressure in chamber 23, the valve 34 is automatically opened and the pressure built up in the lower chamber. When the pressure is the same in both chambers the valve 34 is closed. This pressure in the lower chamber also serves to urge the piston 21 upwardly against the packing ring 39 whereby to force this ring more tightly into place. Assuming that the pressure in the two chambers is the same, the valve 10 will be lifted immediately the cam begins to lift the tappet assembly. This lifting tends to increase the pressure in chamber 23 since the cylinder 17 is slidable about the plunger 19 and as said pressure increases the piston applies additional pressure to the packing ring 39 to spread it and cause it to tightly engage the piston and the cylinder wall and thereby prevent leakage. The greater the pressure in chamber 23 the more tightly will ring 39 engage the inner walls of cylinder 17 and the taper 29 on plunger 21 and therefore will effectively prevent leakage of the oil from chamber 23 even though the engine may be operating at low speed. Therefore this construction will immediately lift the valve 10 as soon as the cam starts to lift the member 17 and delayed operation as was common in the old construction is eliminated. It is also to be noted that any leakage that may occur from chamber 23 will be directly into chamber 22 or the groove 27, that is, into the source of fluid pressure supply for this chamber. This further tends to reduce leakage of liquid from the operating pressure chamber 23 over old constructions where the operating liquid was permitted to leak to the low pressure of the crank case.

Immediately below the piston 21 when the latter is in normal position and spaced from the piston about the usual distance used in ordinary constructions between the end of the valve stem 11 and the tappet, the cylinder is provided with an annular shoulder 46 or with shoulder portions so that should the hydraulic pressure fail the device will continue to operate with a lost motion equal only to the normal distance between the lower side of the piston and the shoulder 46. This distance is only a few thousandths of an inch and it will therefore be apparent that on the loss of pressure for any reason the tappet will continue to perform with little if any noise in excess of that commonly encountered with the ordinary tappet construction. While the pressure is maintained the head 18 of the cylinder will ride constantly on the cam 14 and the plunger or the screw 20 carried by it will remain constantly in engagement with the lower or free end of the valve stem 11.

Therefore, there is no lost motion and there will be no noise resulting from the constant hammer-like blows delivered in the usual type of mechanism. Further, expansion of the parts due to heating up of the engine in its normal operation is compensated for due to the fact that there is no positive solid connection between the cylinder and plunger. Also, any wear is automatically compensated for. It will, of course, be understood that neither of the springs 44 or 45 is of sufficient strength to unseat the valve 10 and in fact the two springs combined do not possess sufficient strength to overcome the spring 13 about the valve stem.

Referring now to Fig. 8, the tappet assembly of that figure is quite similar to that of Fig. 1 and operates in substantially the same manner, and where the parts are the same, identical reference characters have been used. In this figure the plunger 19 is tapered at its inner end as at 47 and the taper has been omitted from the upper end portion of the psiton 21. With these slight changes the packing ring 39 has had its position reversed and is now so arranged that its tapered surface 42 is engaged by the tapered surface 47 of the plunger.

The spring 44 pressing upwardly on the piston causes the tapered portion of the ring 39 to tightly engage the tapered portion of the plunger and the lower end of the ring to tightly engage the top wall of piston 21, and when the fluid under pressure enters the chamber 23 the ring will be forced more tightly against the plunger and will be expanded against the inner surface or wall of the cylinder so as to provide a seal. The fluid under pressure will be supplied in a manner already described and will co-operate and function with the parts as in the case of the assembly of Fig. 1.

Referring now to Fig. 9, the assembly here shown includes the stationary housing or guide 16, and a cylinder 48 including a head 49 to ride on a cam the same as the other forms, as will be understood. The cylinder is hollow and open at its upper end and through said end receives a plunger 50 which at its outer end may be equipped with any or the usual means 20 for engaging the lower end of the valve stem 11. At its inner end the plunger 50 is tapered as at 51 and co-operating with this taper is the tapered surface 42 of the packing ring 39.

A disc 52 engages the lower edge of ring 39 and a coil spring 53 arranged beneath the disc normally urges it upwardly to press the packing against the plunger and thereby expand the packing to form a seal as has been explained. The housing 16 includes a tapped opening 54 to receive a tube or pipe whereby fluid under pressure from the oil pump or other source will be supplied to a circumferentially extending relatively wide groove 55 which at its lower end through a port 56 communicates with the chamber or compartment in which the spring 53 is located. When this compartment is filled with oil or other fluid under pressure such fluid will of course exert an upward push on the disc 52 to cause further expansion of the packing 39.

While the device of Fig. 9 involves fewer and simpler parts than do the devices of Figs. 1 and 8 and may therefore be used on less expensive cars, it is not at present deemed as desirable as the devices first described. In operation the last described device is apt not to be so quick to lift the valve while the engine is operating at lower speeds since as the lifting portion of the cam engages the head 49 of the cylinder 48 and urges the cylinder upwardly the first effect is to raise the pressure of the oil in the spring chamber with the result that a certain amount of oil will be forced out of the chamber through the port 56. When the parts reach the position whereby port 56 is closed by the disc 52 and the ring 39 further escape of oil is prevented and the plunger will then move upwardly as does the cylinder. However, for a short interval the cylinder may move independent of the plunger since there is an escape for the oil. Member 28 is provided with a shoulder 48a a short distance below the disc 52 and opening 56 so that should the oil pressure fail this shoulder will engage the disc 52 and operate the engine valve with a direct connection.

Having thus set forth the nature of my invention, what I claim is:

1. In a valve tappet, a cylinder member, said member closed at one end, a plunger member in said cylinder member and forming therewith a chamber, means for supplying fluid under pressure to said chamber, said plunger tapered at its inner end, a split packing ring within said chamber, said ring including a tapered portion engaging the tapered portion of the plunger, a spring means urging said ring against the plunger to spread the ring against the wall of the cylinder member and form a seal to prevent leakage of said fluid between the plunger and cylinder, and said fluid acting as a cushioning means between said members and to transmit motion from one to the other thereof.

2. In a valve tappet, a cylinder member, said cylinder member having a closed end, a plunger member within the cylinder member and forming a chamber therein, said cylinder member having a circumferential groove in its outer surface and a port from said groove to said chamber, means for supplying fluid under pressure to said groove and through said port to said chamber, said plunger tapered at its inner end, a split packing ring within said chamber, said ring including a tapered portion engaging the tapered portion of the plunger, a spring means urging said ring against the plunger to spread the ring against the wall of the cylinder and form a seal to prevent leakage of said fluid between the plunger and the cylinder, and said fluid adapted to act as a cushioning medium between said members and to transmit motion from one to the other thereof.

3. In a valve tappet, a stationary guide, a cylinder member slidable in the guide, said cylinder member having a closed end, a plunger member within the cylinder member and forming a chamber therein, a piston in said chamber and dividing it into a pair of compartments, means for supplying fluid under pressure to that compartment between the piston and plunger, said piston having a port therethrough, a valve normally closing said port, said valve adapted to open when the pressure at the plunger side of the piston exceeds that at the other side thereof to thereby admit fluid under pressure to the second of said compartments, and said fluid in said second compartment in co-operation with said piston forming a cushioning medium between said members and acting to transmit motion from one to the other thereof.

4. In a valve tappet, a stationary guide, a cylinder member slidable in the guide, said cylinder member having a closed end, a plunger member within the cylinder member and forming a chamber therein, a piston in said chamber and dividing it into a pair of compartments, a packing ring between the piston and the plunger member, a spring normally urging the piston against the ring to force the ring against the plunger member and the inner surface of the cylinder member to form a seal and prevent leakage between the members, means for supplying fluid under pressure to that compartment between the piston and plunger, said piston having a port therethrough, a valve normally closing said port, said valve adapted to open when the pressure at the plunger side of the piston exceeds that at the other side thereof to thereby admit fluid under pressure to the second of said compartments, and said fluid in said second compartment in co-operation with said piston forming a cushioning medium between said members and acting to transmit motion from one to the other thereof.

5. In a valve tappet, a stationary guide, a cylinder member slidable in the guide, said cylinder member having a closed end, a plunger member within the cylinder member and forming a chamber therein, a piston in said chamber and dividing it into a pair of compartments, means for supplying fluid under pressure to said chamber between the piston and plunger, a port connecting said compartments, a valve closing said port and adapted to open automatically when the pressure of said fluid at the plunger side of the piston exceeds that at the other side thereof, and said fluid at the said other side of said piston in co-operation with said piston forming a cushioning medium between said members and acting to transmit motion from one to the other thereof.

6. In a valve tappet including a stationary housing, a cylinder slidable in said housing and having a closed and an open end, a hollow plunger within the cylinder and open at its inner end, a piston within said cylinder and closing the inner end of said plunger and forming a pair of compartments of which one is within the plunger and the other below the piston, a coil spring in the lower chamber and adapted to maintain the piston in position closing the lower end of the plunger, said cylinder having a circumferential groove in its outer surface and a port from said groove to the interior of the cylinder, means for supplying fluid under pressure to said groove, said plunger having a circumferential groove in its outer surface to receive fluid from the port in the cylinder and said plunger having a port from its groove to its interior, said piston having a passage therethrough, a valve normally closing said passage, said valve adapted to open when the pressure of fluid in the inner compartment exceeds that of the fluid in the outer compartment whereby to permit of a transference of fluid from the inner to the outer compartment, and said fluid in the outer compartment serving to transmit motion of the cylinder to the plunger.

7. In a valve tappet, a stationary guide, a cylinder member slidable in the guide, said cylinder member having a closed end, a plunger member within the cylinder member and forming a chamber therein, a piston in said chamber and dividing it into a pair of compartments, means for supplying fluid under pressure to that compartment between the piston and plunger, said plunger tapered at its inner end, a split packing ring within the chamber between the piston and the plunger member, said ring including a tapered portion engaging the tapered portion of the plunger member, a spring normally urging the piston against the ring to force it against the plunger to spread the ring against the wall of the cylinder and form a seal to prevent leakage of said fluid between the plunger and cylinder, said piston having a port therethrough, a valve normally closing said port, said valve adapted to open when the pressure at the plunger side of the piston exceeds that at the other side thereof to thereby admit fluid under pressure to the second of said compartments, and said fluid in said second compartment in co-operation with said piston forming a cushioning medium between said members and acting to transmit motion from one to the other thereof.

8. In a valve tappet, a stationary guide, a cylinder member slidable in the guide, said cylinder member having a closed end, a plunger member within the cylinder member and forming a chamber therein, a piston in said chamber and dividing it into a pair of compartments, means for supplying fluid under pressure to that compartment between the piston and plunger, said piston having a tapered portion, a split packing ring within the chamber between the piston and the plunger member, said ring including a tapered portion engaging the tapered portion of the piston, a spring normally urging the piston against the ring to force the ring against the plunger and spread the ring against the wall of the cylinder and thereby form a seal to prevent leakage of fluid between the plunger and cylinder, said piston having a port therethrough, a valve normally closing said port, said valve adapted to open when the pressure at the plunger side of the piston exceeds that at the other side thereof to thereby admit fluid under pressure to the second of said compartments, and said fluid in said second compartment in co-operation with said piston forming a cushioning medium between said member and acting to transmit motion from one to the other thereof.

9. In a valve tappet, a reciprocable cylinder having an interior space closed at one end and open at the other, a plunger member in said cylinder and forming therewith a chamber between the plunger and the closed end, means for supplying fluid under pressure to said chamber, a transverse slidable member fitting the walls of the cylinder in said chamber, one of said members having a tapered end wall, an expansible packing ring within the chamber between said members and engaging the walls of the cylinder, one end of the ring being tapered to fit the tapered end of the member, and a spring pressing the transverse member against the ring to expand it against the walls of the cylinder, and said fluid between the transverse member and the closed end of the cylinder acting as a cushioning medium between the cylinder and plunger to transmit motion from one to the other.

STEPHEN GEORGE.